Figure 1:
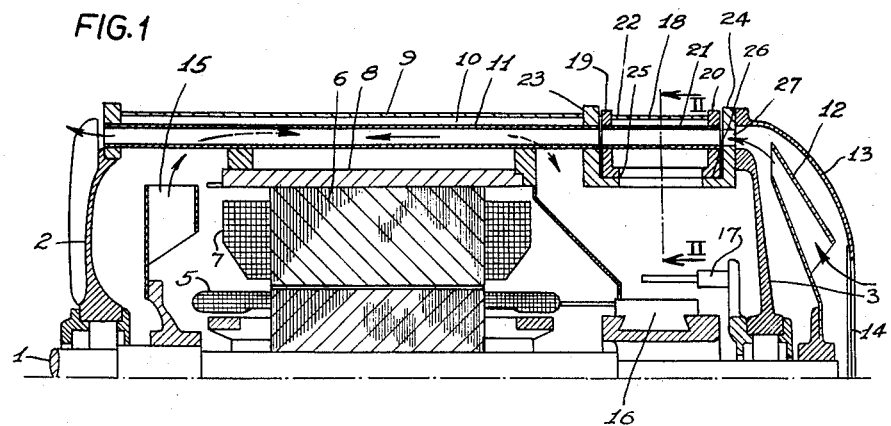

April 20, 1954  S. VOLL  2,676,277
ROTARY ELECTRIC MACHINE WITH TUBULAR COOLERS
Filed Dec. 23, 1952

Inventor:-
Siegfried Voll
By
C. M. Avery
Attorney

Patented Apr. 20, 1954

2,676,277

UNITED STATES PATENT OFFICE 2,676,277

ROTARY ELECTRIC MACHINE WITH TUBULAR COOLERS

Siegfried Voll, Nurnberg, Germany, assignor to Siemens - Schuckertwerke Aktiengesellschaft, Berlin-Siemensstadt, and at Erlangen, Germany, a German corporation Application December 23, 1952, Serial No. 330,207

4 Claims. (Cl. 310—57)

My invention relates to dynamoelectric and similar rotary electric machines which have a tubular cooler mounted in an annular space between the stator portion and a surrounding sheet-metal jacket and traversed by a flow of cooling air. More particularly, my invention deals with machines of the just-mentioned kind that have an enclosed commutator or collector with pertaining contact brushes accessible from the outside through one or more lid-covered service openings.

In the known machines of this type, the bearing shield at the side of the brushes is either given a bulging shape so that it extends over the brushes and has lateral servicing doors, or the bearing shield has a flat shape with doors arranged on the front side. In the one case, the stator magnet structure and the tubular cooler of the machine extend only over about the length of the electromagnetically active machine portion thus having a rather small cooling surface and a correspondingly limited cooling effect. In the other case, the access to the brushes is very difficult. Besides, in both cases, the blower for the exterior flow of cooling air can be mounted only on the machine side away from the brushes, unless the collector slip rings or commutator segments are mounted in a separate capsule.

It is an object of my invention to eliminate such deficiencies and limitations.

To this end, and in accordance with my invention, I provide the sheet-metal jacket of a tube-cooled machine with one or more service openings that extend over part of the jacket periphery at the place of the contact brushes, and I cover the opening or openings with a lid or door structure whose exterior shape is curved in accordance with the jacket periphery. I further provide the covering structure with one or more cooling tubes and have them extend inside the structure in line with the cooler tubes that traverse the annular space between the jacket and the stator.

Figure 2:
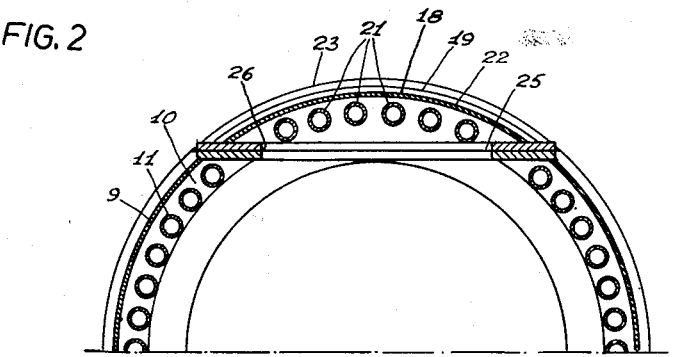

The foregoing and more specific objects and features of my invention will be apparent from the following description in conjunction with the embodiment exemplified on the drawing in which:

Fig. 1 is an axial section through a dynamo-electric machine of the collector type, such as a motor or generator, only the upper half of the machine being shown; and Fig. 2 is a cross sectional view of part of the machine, the section being taken in the plane indicated at II—II in Fig. 1.

The shaft 1 of the illustrated machine is revolvable in two bearings joined with respective bearing shields 2 and 3. The rotor mounted on shaft 1 comprises a laminated magnetizable structure 4 with rotor windings 5. The stator, surrounding the rotor, is composed of a laminated magnet structure 6 with windings 7 and a stator housing 8. A cylindrical sheet-metal jacket 9 encloses the stator and rotor with sufficient peripheral spacing to form an annular jacket space at 10 between the inner jacket surface and the stator housing 8. The space 10 is axially traversed by the parallel tubes 11 of a tubular cooler. A blower 12, mounted on shaft 1 outside the shield 3, forces a flow of cool air from the ambient air through the tubes 11. The blower 12 is covered by a hood portion 13 which may form an integral part of bearing shield 3 and has an axial inlet opening for air covered by a screen or grill 14. The air inducted by blower 12 passes from the other end of tubes 11 back into the ambient air so that this air flow acts as an exterior cooling. Another blower 15, mounted on shaft 1 within the jacket-enclosed space, serves to circulate the enclosed air through the jacket space 10 along the tubes 11 in counterflow to the exterior cooling air. Also mounted on shaft 1 is a commutator 16 to whose contact parts the rotor windings 5 are connected. The contact brushes for the commutator are represented only by the pertaining brush holder 17 which is joined with the bearing shield 3.

Within the axial range of the commutator 16 and the brush holder 17, the jacket 10 is interrupted by an access opening which is covered by a cover structure 18 designed as a door or removable lid. This cover structure consists essentially of two segment-shaped end plates 19 and 20 interconnected by additional cooling tubes 21, and of a sheet-metal jacket 22 covering the cooling tubes. The end plates 19, 20 form plane surfaces at 25 and 26 to provide a seal together with correspondingly-shaped faces of respective parts 23, 24 of the magnet frame or machine-jacket structure. When the cover structure 18 is closed, the cooling tubes 21 are in line with the cooling tubes 11 extending over the electromagnetically active portion of the machine and are also aligned with air-inlet openings 27 in shield 3. While only one service opening and cover structure is shown, two or more may readily be provided.

Although the service openings are disposed in a most convenient location on the periphery of the magnet-frame or stator-housing structure, the machine is nevertheless surrounded by cooling tubes over the entire periphery and nearly over its entire length, so that a large cooling surface is utilized thus securing excellent cooling conditions. As shown, the blower for the exterior flow of cooling air may readily be arranged on the brush side whereby in mechanical respects better driving conditions are obtained.

It will be obvious to those skilled in the art that, as regards design details, my invention is amenable to various modifications without departure from its essential features and within the scope of the claims annexed hereto.

I claim:

1. In an enclosed rotary electric machine having a stator, a rotor journalled within the stator and a commutator on the rotor, the combination comprising a sheet-metal jacket enclosing said stator and forming together therewith an annular jacket space around said stator, cooling means comprising a plurality of parallel tubes mutually spaced within said annular space and substantially coextensive with said rotor between the journals thereof, said jacket having a service opening extending over a part of said jacket at the location of said commutator, and a cover structure for closing said opening, said cooling means comprising a plurality of tube sections fixed to the underside of said cover structure and aligned with respective adjacent ones of said parallel tubes to form through-conduits together therewith, whereby when said cover structure is removed, access can be had through said jacket and cooling means to said commutator.

2. In an electric machine according to claim 1, said cover structure having two segment-shaped end plates disposed at its two coaxial ends respectively and extending in respective radial planes of the machine, two plane parts mounted on said jacket and having respective sealing faces in face-to-face relation to said respective end plates, said tube sections of said cover structure being mounted on and between said two end plates.

3. An electric machine according to claim 1, comprising axial end shields closing said jacket at its respective axial ends, said commutator and said opening and said cover structure being disposed between one of said shields and said stator, said one shield having air inlet openings aligned with each of said plurality of tubes, and a blower coaxially revolvable with said rotor and disposed outside of said one shield and in front of said air inlet openings.

4. An electric machine according to claim 1, comprising axial end shields closing said jacket at its respective axial ends, said commutator and said opening and said cover structure being disposed between one of said shields and said stator, said one shield having air inlet openings aligned with each of said plurality of tubes, a first blower coaxially revolvable with said rotor and disposed outside of said one shield and in front of said air inlet openings, and a second blower coaxial with said rotor and disposed at the inside of said other shield for circulating the air within said machine and past the outside of said plurality of tubes.

References Cited in the file of this patent

UNITED STATES PATENTS

| Number | Name | Date |
|---|---|---|
| 1,157,497 | Bliss | Oct. 19, 1915 |
| 2,179,561 | Oesterlein | Nov. 14, 1939 |

FOREIGN PATENTS

| Number | Country | Date |
|---|---|---|
| 470,607 | Great Britain | Aug. 18, 1937 |
| 526,656 | Great Britain | Sept. 23, 1940 |